United States Patent
Smith et al.

(10) Patent No.: US 10,122,440 B2
(45) Date of Patent: Nov. 6, 2018

(54) REMOTE SPECTRUM ANALYSIS (71) Applicant: Hughes Network Systems, LLC, Germantown, MD (US)

(72) Inventors: Brian Smith, Mount Airy, MD (US); Zengquan Fan, North Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 14/748,311

(22) Filed: Jun. 24, 2015

(65) Prior Publication Data

US 2016/0381578 A1 Dec. 29, 2016

(51) Int. Cl.
*H04W 24/08* (2009.01)
*H04B 7/185* (2006.01)

(52) U.S. Cl.
CPC ..... *H04B 7/18528* (2013.01); *H04B 7/18517* (2013.01)

(58) Field of Classification Search
CPC .... H04B 17/23; H04B 17/309; H04B 17/319; H04W 24/08; H04W 16/14
USPC .................................. 455/67.11, 67.12, 67.14
See application file for complete search history.

(56) References Cited

U.S. PATENT DOCUMENTS

| | | | | |
|---|---|---|---|---|
| 6,134,445 A * | 10/2000 | Gould | ................... | H04W 24/00 379/433.04 |
| 7,791,329 B2 * | 9/2010 | Stein | ...................... | G01R 27/28 324/620 |
| 8,780,968 B1 * | 7/2014 | Garcia | ................... | H04W 24/08 375/228 |
| 2004/0071201 A1 * | 4/2004 | Klenner | ............... | H04B 17/391 375/224 |
| 2005/0003765 A1 * | 1/2005 | Alfano | ................... | H04W 48/18 455/67.11 |
| 2006/0246843 A1 * | 11/2006 | Hirvonen | ........... | G01R 29/0821 455/67.11 |
| 2007/0178888 A1 * | 8/2007 | Alfano | ................. | H04W 76/028 455/414.1 |
| 2007/0286269 A1 * | 12/2007 | Hill | .......................... | G01R 1/02 375/228 |
| 2010/0153055 A1 * | 6/2010 | Mucha | ................ | H04L 12/2697 702/122 |
| 2013/0072129 A1 * | 3/2013 | Donovan | ............... | H03F 1/0216 455/67.11 |
| 2013/0326089 A1 * | 12/2013 | Harrison | ................. | H04M 1/24 710/5 |
| 2014/0038630 A1 * | 2/2014 | Kallin | ................... | H04W 24/08 455/452.1 |
| 2014/0269875 A1 * | 9/2014 | Garcia | .................. | H04W 24/08 375/227 |
| 2015/0257118 A1 * | 9/2015 | Siomina | .................. | G01S 5/021 455/456.1 |

(Continued)

*Primary Examiner* — Erica Fleming-Hall
(74) *Attorney, Agent, or Firm* — Bejin Bieneman PLC (57) ABSTRACT

A computer for a communications terminal includes a memory and a processor. The computer is programmed to identify a spectrum analysis test triggering event. The computer specifies a set of test parameters that include a test frequency range. The computer further sets a receiver to receive sequentially a plurality of signals. Each signal is received in one of a plurality of frequency bands within the frequency range. The computer measures, via the receiver, at least one characteristic of the signal received in each frequency band.

19 Claims, 5 Drawing Sheets (56) References Cited

U.S. PATENT DOCUMENTS

2015/0289154 A1* 10/2015 Pratt ................... G01R 23/16
  455/67.14
2016/0183218 A1*  6/2016 Ioffe ................... H04B 7/0486
  455/452.1

* cited by examiner

REMOTE SPECTRUM ANALYSIS

BACKGROUND

Communications from network operation centers via satellites to very small aperture terminals (VSATs) are an important part of certain communication infrastructures. Communications via satellites to VSATs support media broadcasting services, Internet and other packet network access, telephone communications, Voice over IP (VoIP), etc. Satellite communications make it practical to provide communication services to remote locations which may be difficult to serve through land based communication systems. In many cases remote communications terminals for radio frequency communications, such as very small aperture terminals (VSATs), are located in remote locations which may be difficult to reach. The logistics of putting a spectrum analyzer at a site where interference is suspected is often prohibitively expensive or impossible. Additionally, trouble shooting of a failure event may warrant measurements that are conducted close in time to the failure event.

DETAILED DESCRIPTION

Overview

Figure 1:
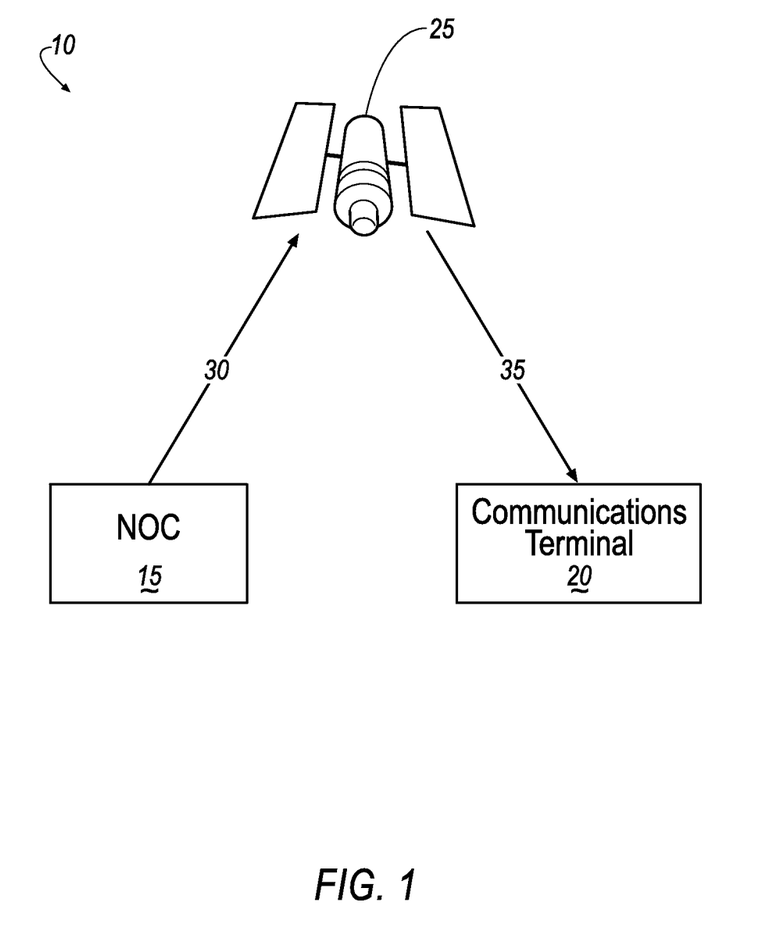
FIG. 1 is a block diagram of an exemplary communications system.

Remote communications terminals can be provided with a spectrum analysis mode, during which a receiver module of the remote communications terminal is configured or reconfigured to execute a spectrum analysis test. A spectrum analysis test may include, e.g., a series of spectrum analysis measurements conducted at different frequency bands within a test frequency range. FIG. 1 illustrates an exemplary communications system 10 for radio frequency (RF) communications between a network operation center (NOC) 15 and a communications terminal 20, where the communications terminal 20 is configurable to perform a spectrum analysis test.

For example, the communications terminal 20 may be programmed to identify a triggering event for conducting a spectrum analysis test. Upon identifying a triggering event, the communications terminal 20 reconfigures the receiver section of the communications terminal to perform the test. Based on a set of received test parameters, the receiver determines a range of receive frequencies to be measured. The receiver performs a sweep through the range of receive frequencies and measures one or more characteristics of a received signal at each frequency. The communications terminal 20 stores the measured data, and may further, for example, provide the data to the NOC 15 for further analysis, or display the data on an interface for an operator.

Repurposing the receiver of the communications terminal 20 as disclosed herein advantageously allows the communications terminal 20 to gather data which may be used to identify interference signals, and, when combined with other real time automatic triggers, perform real time trouble shooting of failure events. The data may be provided locally to operators of the communications terminal 20 and may further be provided remotely, for example, to the NOC 15 where the data can be used to analyze, for example, fault conditions and failure events.

Exemplary System Elements

Referring now to FIG. 1, the communications system 10 includes the NOC 15, one or more communications terminals 20, and one or more satellites 25. The NOC 15 transmits outbound signals to the communications terminal 20 via the communications channel 30 to a satellite 25, which relays the outbound signals over the communications channel 35 to the communications terminal 20. Conversely, the communications terminal 20 transmits return signals via the communications channel 35 to the satellite 25, which relays, via the communications channel 35, the return signals to the NOC 15. The communications channels 30, 35 are frequency bands used for two-way radio frequency (RF) communications between the satellite 25 and respectively the NOC 15 and the communications terminal 20.

Various types of communications may be provided in the communications system 10, e.g., Internet or other packet network access, telephone communications, Voice over IP (VoIP), audio and video transmissions, communications related to guidance systems, etc. Typically, satellite communications are conducted in the Ku band, a radio frequency band from 12 GHz to 14 GHz. Different frequencies within the Ku band are typically used for communication to the satellite 25 and from the satellite 25. For example, communications from the NOC 15 or the communications terminal 20 to the satellite 25 may be conducted in the 14 GHz range, and transmissions from the satellite 25 to the NOC 15, and the communications terminal 20 may be conducted in the 12 GHz range.

Other frequency bands may be used for satellite communications. Examples of other suitable frequency bands for use by the system 10 are the C-band from 5.85 to 6.725 GHz, and the Ka band from 29.5 to 30.0 GHz.

The satellite 25 includes a radio frequency relay station, such as is known. As described above, communications between the NOC 15 and the satellite 25 occur via a communications channel 30. The satellite 25 relays the outbound signal from the NOC 15 to the communications terminal 20. Similarly, the satellite 25 relays the return signal from the communications terminal 20 to the NOC 15. Each satellite 25, as is known, includes a first receiver for receiving outbound signals from the NOC 15, a first transmitter for relaying the outbound signals to the communications terminal 20, a second receiver for receiving return signals from the communications terminals 20, and a second transmitter for relaying the return signals to the NOC 15.

In addition to relaying communications between the communications terminal 20 and NOC 15, the satellite 25 may scale carrier frequencies of the relayed signals. For example, the satellite 25 may receive an outbound signal from the NOC 15 with a carrier frequency in the range of 14 GHz, and relay the signal to the communications terminal 20 with a carrier frequency in the range of 12 GHz.

Figure 2:
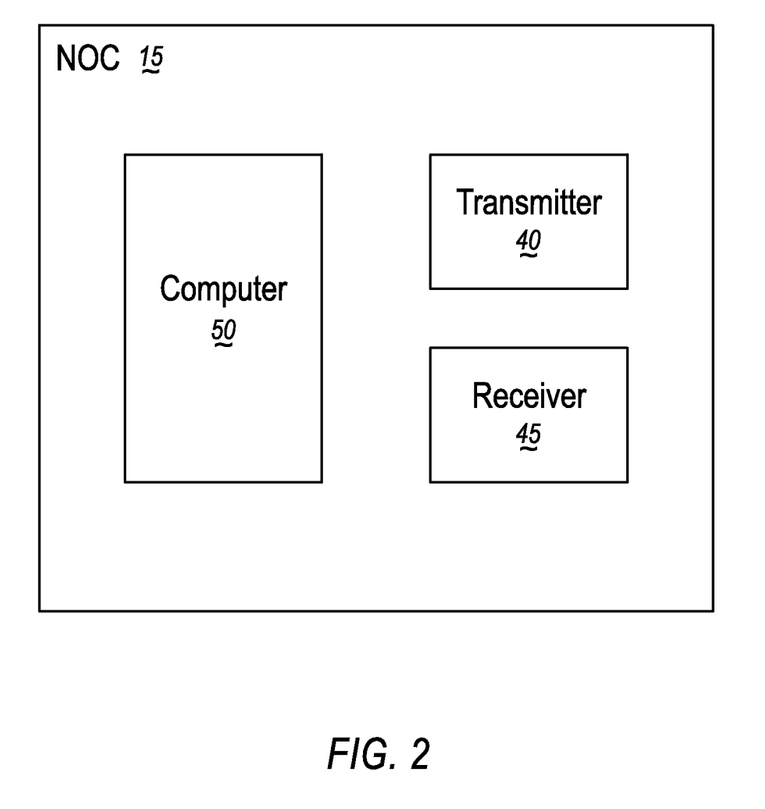
FIG. 2 is a block diagram of an exemplary network operation center for the system of FIG. 1.

The NOC 15 is typically a land-based transmission system such as is known. For example, the NOC 15 may communicate with multiple communications terminals 20 substantially simultaneously, managing large amounts of incoming and outgoing data, and generating radio frequency transmissions at power levels sufficient to reach communications satellites 25. As shown in FIG. 2, the NOC 15 includes a transmitter 40, a receiver 45, and a computer 50.

The transmitter 40 is communicatively coupled to the computer 50 and is programmed to transmit outbound signals to the communications terminal(s) 20 via the satellite 25. The outbound signal generated by the NOC 15 may be constructed according to known signal protocols for transmission to the communications terminal 20. Examples of such signal protocols are time division multiplexing (TDM), bursted TDM, bursted time division multiple access (TDMA), etc. Typically, signals received by the communications terminal 20 are TDM formatted signals, and return signals transmitted by the communications terminal 20 are bursted TMDA formatted signals.

The receiver 45 is communicatively coupled to the computer 50. The receiver 45 receives return signals from the communications terminal 20 via the satellite 25. As described further below, the receiver 45 extracts data from the return signal and provides the extracted data to the computer 50.

The computer 50 includes a processor and a memory, and is communicatively coupled to the transmitter 40 and the receiver 45. The computer 50 may be programmed to transmit one or more parameters to the communications terminal 20 specifying a spectrum analysis test. The computer 50 may be programmed to send a command to the communications terminal 20 to initiate a spectrum analysis test, and may further be programmed to receive measurement data associated with the spectrum analysis test performed by the communications terminal 20.

Figure 3:
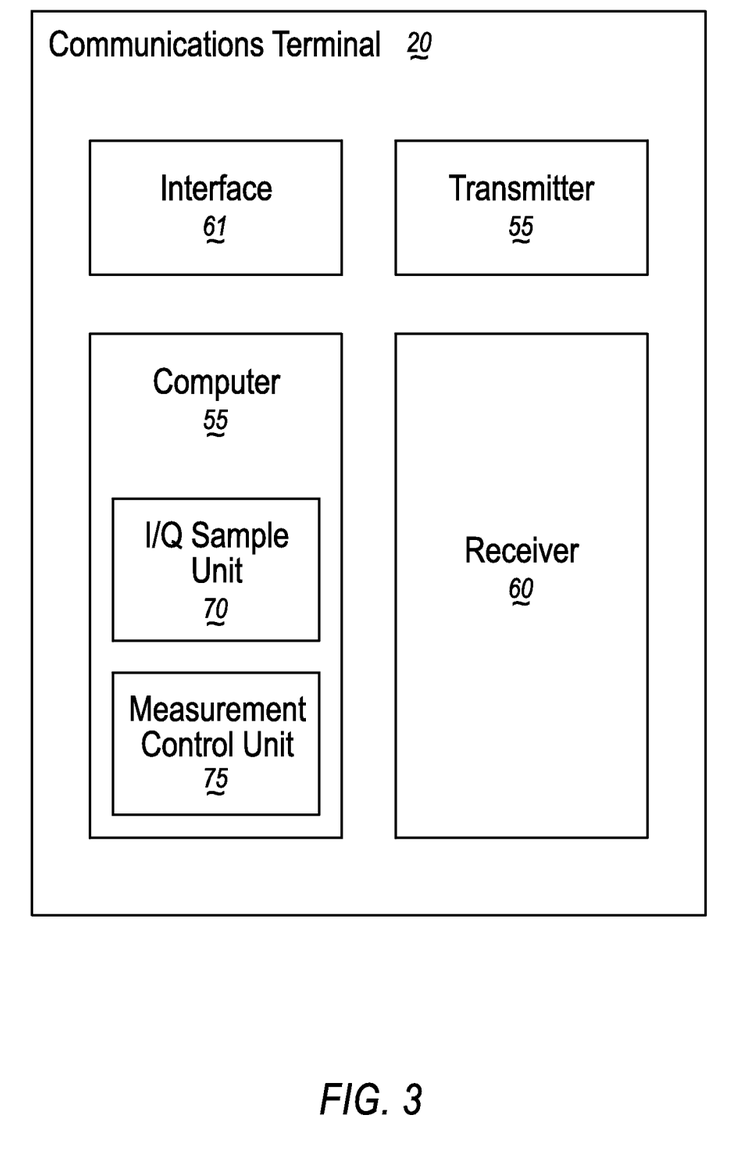
FIG. 3 is a block diagram of an exemplary communications terminal for the system of FIG. 1.

As shown in FIG. 3, the communications terminal 20 includes a transmitter 55, a receiver 60, a user interface 61, and a computer 65. In addition to providing general communications with the NOC 15 as described above, the communications terminal 20 is programmable to detect a triggering event, and to initiate and execute spectrum analysis tests. The communications terminal 20 may be a very small aperture terminal (VSAT). Examples of VSATs which may be reconfigurable to execute spectrum analysis tests include the Jupiter HT1100, HN and HX terminals sold by Hughes Network Systems, LLC with the address 11717 Exploration Lane, Germantown, Md. 20876.

The transmitter 55 is communicatively coupled to the computer 65, and is programmable to transmit return signals to the NOC 15. The transmitter 55 may be, e.g., programmed to transmit, following a spectrum analysis test, results of the spectrum analysis measurement to the NOC 15.

The receiver 60 is communicatively coupled to the computer 65. The receiver 60 may be programmed to receive the outbound signal from the NOC 15, via the satellite 25, as described above. The receiver 60 is configurable, in a spectrum analysis test mode, to sweep through a series of frequency bands, determine characteristics of a received signal respectively in each of the frequency bands, and provide the characteristics of the received signals to, e.g., the computer 65, for analysis. The characteristics may include, e.g., I/Q values, e.g., as are known, for the received signal in each of the respectively frequency bands. An "I" value is an amplitude and phase as a function of time of a real component of a transmitted signal. A "Q" value is an amplitude and phase as a function of time of an imaginary component of the transmitted signal. Signal characteristics may further include, e.g., an amplitude of the signal or a frequency component of the signal, a power level of the signal or a frequency component of the signal, a phase of the signal or a frequency component of the signal, relative to a reference signal, etc.

The receiver 60 of a commercially available communications terminal 20 is typically tunable to receive signals within specific frequency bands. Further, the receiver 60 typically extracts I/Q values of a received signal for further processing. The I/Q values, taken over a range of frequency bands, provide the information required to perform a spectrum analysis. In this manner, the receiver 60 in the communications terminal may be repurposed to perform a spectrum analysis test.

The interface 61 may provide output to, and receive input from, a user, and may include a display for displaying graphical user interfaces (GUIs) and receiving input from a user via a mouse or other input device. The interface may additionally or alternatively include other input devices, e.g., keyboards, touch screen displays, gesture recognition devices, touch pad input devices, roller balls, joy sticks, microphones, etc. The interface 61 may further include various output devices such as lamps, LEDs, speakers, buzzers, etc.

The computer 65 includes a processor and a memory and is communicatively coupled to the receiver 60 and the transmitter 55. Generally, the computer 65 is programmed to send messages to and receives messages from the NOC 15 via the satellite 15. Additionally, the computer 65 may include a measurement control unit 70 and an I/Q sample unit 75 for executing spectrum analysis tests.

The measurement control unit 70 may be, for example, computer code stored in the computer 65 memory for executing a spectrum analysis test. The control unit 70 may be programmed to recognize a trigger event for the spectrum analysis test. Upon recognizing the trigger event, the measurement control unit 70 may obtain in measurement parameters, and configure the receiver 60 to sequentially step through a series of frequency bands, and measure a received signal for each of the frequency bands.

For example, a trigger event may be a request from a user of the communications terminal 20 received via the interface 61. The trigger event may additionally be a request from the NOC 15 to execute a spectrum analysis test. Further, the trigger event may be a notification generated by the computer 55, upon recognition of a failure event, or to initiate a scheduled test to monitor performance of the communications terminal 20 and/or its operating environment.

Upon recognizing a trigger event, the measurement control unit 70 may obtain one or more parameters specifying the spectrum analysis test. The parameters may be default parameters stored in the communications terminal 20 during initial set-up. Alternatively or additionally, the test parameters may be input, e.g., by the operator of the communications terminal 20 via the interface 61, or transmitted to the communications terminal 20 from the NOC 15. In some cases, the communications terminal 20 may determine one or more of the measurement parameters based on current or recent operating conditions, for example, based on a recently occurring failure event.

Measurement parameters, sometimes referred to as test frequency parameters, may include, but are not limited to:
 a start frequency and an end frequency specifying a range of a frequency to be measured;
 a resolution, i.e., the size of the frequency step between adjacent measurements, which may correspond to a width of the frequency band for each measurement;

a RX polarization, the polarity of a signal received by the communications terminal 20;

a dwell time, i.e., how long the receiver 60 dwells at each frequency band; and a number of passes, i.e., how many times the communications terminal 20 should repeat the frequency sweep.

For example, the measurement control unit 70 may receive a request from an operator of the communications terminal 20 to perform a spectrum analysis test. The measurement control unit 70 may receive measurement parameters from the operator via the interface 61. The measurement parameters may specify a start frequency of 13 MHz and an end frequency of 14 MHz. The measurements may be performed in 50 KHz steps between these two limits. A dwell time at each frequency range may be specified as 50 mS. A single pass may be specified.

In this case, the communications terminal may perform a first measurement with a center frequency of 13.025 MHz and a bandwidth of 50 KHz, a second measurement at 13.075 MHz, a third measurement at 13.125 MHz, etc. up to a final measurement at a center frequency of 13.975 MHz. Each measurement would be performed for 50 mS (fifty milliseconds).

In addition to executing the spectrum analysis test, the measurement control unit 70 may perform system 10 management functions related to the test such as notifying the NOC 15 when the test has started, configuring the receiver 60 for standard operation following the test, and notifying the NOC 15 when the communications terminal 20 is back in service.

The computer 65 may further include an I/Q sample unit 75. The I/Q sample unit 75 may be programmed to receive I/Q sample values from the receiver 60. The I/Q sample values may represent characteristics of signals received by the receiver 60. The I/Q sample unit 70 may, for example, receive a set of I/Q sample values respectively for each frequency band measured by the receiver 60 during the spectrum analysis test.

Figure 4:
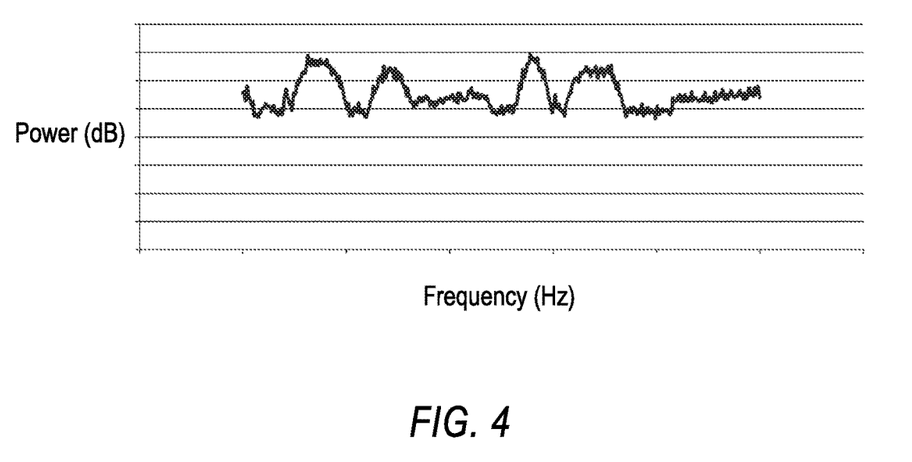
FIG. 4 is a graph of power versus frequency illustrating an exemplary output of a spectrum analysis test performed by the communications terminal of FIG. 3.

Upon receiving the sets of I/Q sample values, the I/Q sample unit may perform a Fast Fourier Transform (FFT), as is known. Based on the FFT, the I/Q sample unit may generate a set of data representing a spectrum distribution over the specified test range. The data may further be presented in graphical form, as a graph of signal power level versus frequency. An example of such a graphical representation of a spectrum analysis test is shown in FIG. 4.

The data generated by the FFT may be presented, for example, to a user of the communications terminal 20 via the interface 61. Additionally or alternatively, the data may be transmitted, e.g., to the NOC 15 for viewing by a user of the NOC 15. Further, the data may be stored in e.g., a memory communicatively coupled the communications terminal 20 computer 55, in a format for further processing, for example in a spreadsheet program.

Exemplary Process Flow

Figure 5:
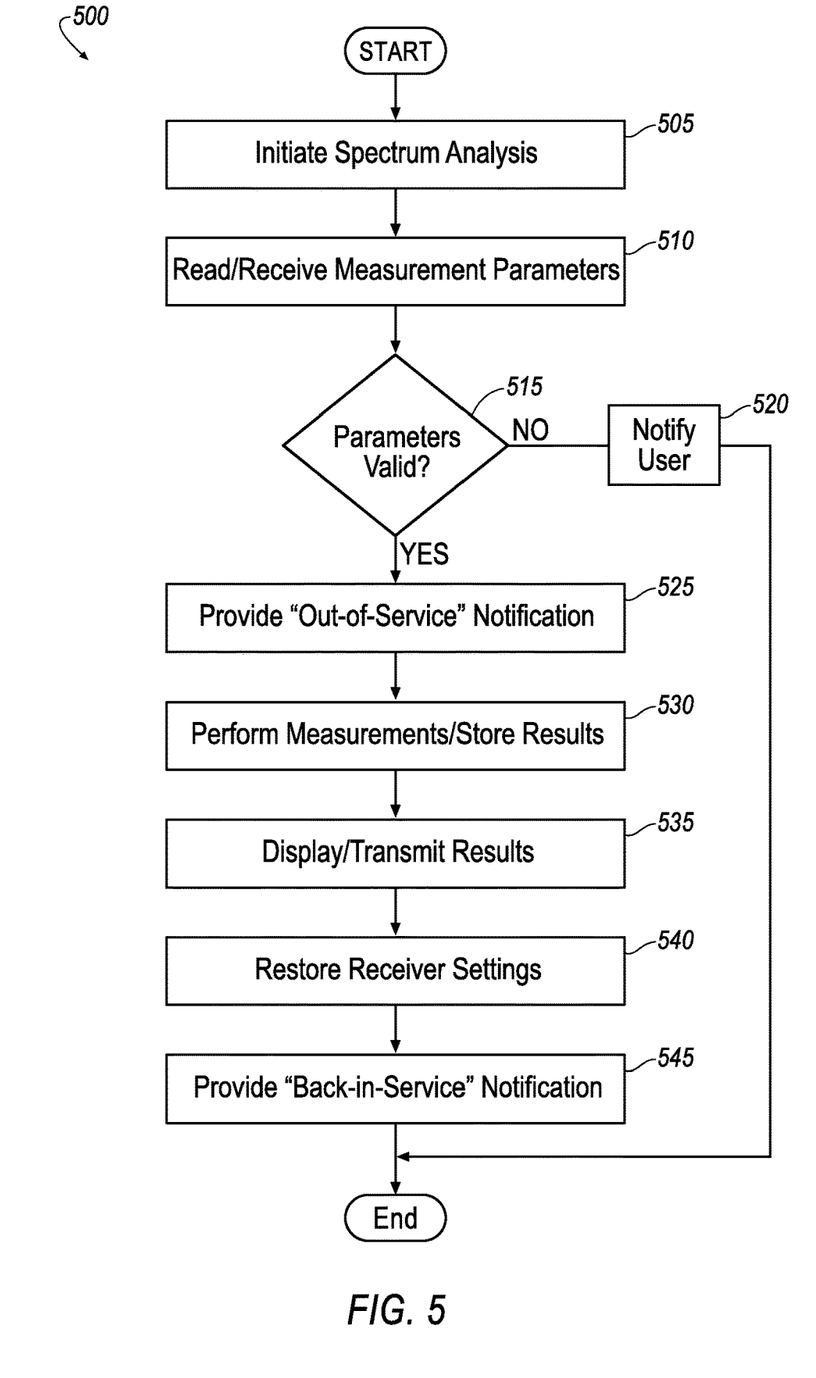
FIG. 5 is a diagram of an exemplary process for using a communications terminal to perform a remote spectral analysis.

FIG. 5 is a diagram of an exemplary process 500 for executing a spectrum analysis test by a communications terminal 20 by reconfiguring a receiver section 60. The process 500 begins in a block 505.

In the block 505, the computer 55 is programmed to identify a trigger event for initiating a spectrum analysis test. For example, as described above, the computer 55 may receive a user input via the interface 61 requesting a test. Alternatively, the computer 55 may receive a request from the NOC 15 to initiate a test. For example, a user of the NOC 15 may send a request via the NOC 15 to initiate the spectrum analysis test. Still further, the computer 55 may be programmed to initiate a measurement based on a detected failure event, e.g., in the communications terminal 20, or to initiate a scheduled test for on-going monitoring of the communications terminal 20. For example, some types of interference occur on a periodic basis (hourly, daily, etc.). The test parameters could include, e.g., a recurring set of time parameters to trigger measurements at times when interference is anticipated. Upon identifying a spectrum analysis test trigger, the process continues in a block 510.

In the block 510, the computer 55 obtains, i.e., reads from a memory communicatively coupled with the computer 55, and/or receives from e.g., the interface 61 or the NOC 15, parameters specifying the spectrum analysis test. As described above, the parameters may be default parameters stored in the memory associated with the computer 55. Alternatively or additionally, the computer 55 may receive measurement parameters from a user of the communications terminal 20 via the communications terminal 20 interface 61, or from a user of the NOC 15. Further, the computer 55 may generate one or more measurement parameters based on a triggering event. For example, the computer 55 may recognize a failure event, and establish a set of measurement parameters that are tailored for the particular type of failure event.

As described above, a non-limiting list of parameters that the computer 50 may receive includes: the start frequency and the end frequency specifying the frequency range to be tested; a resolution or frequency step size between adjacent measurements; the RX polarization; the dwell time for each measurement; and the number of passes through the frequency range.

After reading or receiving the measurement parameters, the process 500 continues in a block 515.

In the block 515, which may be omitted in some implementations, the computer 55 conducts a parameter validity check. The computer 55 may check to determine that each of the specified parameters received in the block 510 falls within a valid range for the particular parameter. For example, a range of valid frequency step sizes may be from 20 KHz to 50 KHz. The computer 55 may confirm that the received frequency step size value falls within this range. In the event that the computer 55 determines that one or more parameters are invalid, the process 500 continues in a block 520. Otherwise, if the computer 55 determines that all of the parameters are valid, the process 500 continues in a block 525.

In the block 520, the computer 55 may send a notice to one or more users of the communications terminal 20 that one or more received measurement parameters is invalid. For example, the computer 55 may display a message on the interface 61, and further send a message to the NOC 15 that the computer 55 has received invalid parameters for the spectrum analysis test. The process 500 may end pending additional input from a user or a new test trigger.

In the block 525, which may follow the block 515, the computer 55 may provide notification that the communications terminal is out of service, in order to perform a spectrum analysis test. The computer 55 may, e.g., send notification to the user of the communications terminal 20 via the interface 61, and send a message to the NOC 15. The process 55 may then continue in a block 530.

In the block 530, the computer 55, executes, via the receiver 60, the spectrum measurement test. As described above, the computer 55 sets the receiver to receive a signal in a first frequency band, which may be, for example, a band of frequencies with a bandwidth equal to the frequency step size and a center frequency equal to the start frequency of the spectrum analysis test offset by half of the frequency step size. The receiver 60 receives a signal and measures characteristics of the signal. The receiver 60 then reports the signal characteristics to the computer 55. The computer 55 may store the signal characteristics. The computer 55 then sets the receiver 60 to a second frequency band. The second frequency band may be, for example, a band of frequencies with a frequency bandwidth equal to the frequency step size, and a center frequency equal to center frequency of the first measurement, plus the step size.

The spectrum measurement test continues to step through the specified test range, until the end frequency is reached. Following each frequency measurement, the computer 55 receives signal characteristics of the signal received at the particular frequency setting, and stores the received characteristics.

The computer 55 may then, via, e.g., the I/Q Sample Unit, analyze the received data. The data received may include, for example, I and Q values of the measured signal for each measured frequency band. The computer 55 may perform a Fast Fourier Transform (FFT) on the received data. The computer 55 may generate, e.g., a spectrum distribution of the relative power of the received signal across the measured frequency range. The process 500 then continues in the block 535.

In the block 535, the computer 55 may output the spectrum analysis test results. For example, the computer 55 may display the results on the communications terminal 61, or transmit the results to the NOC 15. The computer 55 may further store the results such that the results are available for inspection at a later time. For example, the computer 55 may store the results in a comma or tab delimited file or the like, e.g., that may be accessed in a variety of desktop computing applications, such as an electronic spreadsheet application. The process 500 then continues in a block 540.

In the block 540, the computer 55 restores the communications terminal 20 receiver 60 settings for standard communications with the NOC 15. For example, the communications terminal 20 may be assigned a particular frequency band for communicating with the NOC 15 and the computer 55 may restore the receiver settings to that frequency band. The process 500 continues in a block 545.

In the block 545, the computer 55 may notify the NOC 15 that the communications terminal 20 has been returned to normal service. The computer 55 may further, if applicable, provide a notification to the user of the communications terminal 20 via the interface 61. Following the block 545, the process 500 ends.

As described above, the process 500 may be executed by the computer 55 in the communications terminal 20. All or a portion of the process 500 may, however, be executed by one or more other computers communicatively coupled with the computer 55, e.g., the NOC 15 computer 50, or a remote server.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

In the drawings, the same reference numbers indicate the same elements. Further, some or all of these elements could be changed. With regard to the components, processes, systems, methods, etc. described herein, it should be understood that these are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A very small aperture terminal comprising a computer comprising a processor and a non-transitory memory storing instructions executable by the processor such that the computer is programmed to:
    recognize a failure event during operation in a first mode for exchanging messages with a second terminal;
    initiate a spectrum analysis test based on recognizing the failure event;
    generate one or more measurement parameters based on a type of the recognized failure event;
    specify a set of test parameters based at least in part on the generated one or more measurement parameters, the set of test parameters including one or more of a test frequency range, a resolution, a dwell time, an RX polarization and a number of passes;
    reconfigure, for the very small aperture terminal in radio frequency communications with the second communications terminal, a receiver in the very small aperture terminal from the first mode for exchanging messages with the second communications terminal to a second mode for receiving sequentially a plurality of signals from the second communications terminal, each signal being received in one of a plurality of frequency bands within the test frequency range based on the specified set of test parameters; and
    measure, via the receiver, at least one characteristic of the signal received respectively in each frequency band.

2. The very small aperture terminal of claim 1, the computer further programmed to:
    select the plurality of frequency bands such that substantially all frequencies within the specified frequency test range are measured.

3. The very small aperture terminal of claim 1, the computer further programmed to:
store at least one of the measured signal characteristics from at least one of the settings.

4. The very small aperture terminal of claim 3, the computer further programmed to:
analyze the stored signal characteristics to determine a spectrum distribution over the frequency test range.

5. The very small aperture terminal of claim 4, the computer further programmed to:
store data representing the spectrum distribution.

6. The very small aperture terminal of claim 1, wherein the at least one characteristic of the signal includes I and Q sample values, wherein the I value includes an amplitude and phase as a function of time of a real component of the signal and the Q value includes an amplitude and phase as a function of time of an imaginary component of the signal.

7. The very small aperture terminal of claim 1, the computer further programmed to:
receive a trigger event from at least one of user input and a remote communications device in communication with the first communications terminal; and
initiate the spectrum analysis test based on the trigger event.

8. The very small aperture terminal of claim 1, wherein specifying the spectrum analysis test includes:
identifying a start frequency;
identifying an end frequency; and
identifying a frequency band width for each measurement.

9. The very small aperture terminal of claim 1, the computer further programmed to:
send a notification to one or more remote communications devices that the very small aperture terminal is out of service prior to starting the spectrum analysis test.

10. The very small aperture terminal of claim 1, the computer further programmed to:
reset the receiver for communications with one or more remote communications devices following the spectrum analysis test; and
send the notification to at least one of the one or more remote communications devices that the very small aperture terminal is back in service.

11. The very small aperture terminal of claim 1, wherein at least one of the test parameters is stored in a memory communicatively coupled with the computer.

12. The very small aperture terminal of claim 1, the computer further programmed to:
receive at least one of the test parameters from at least one of user input and a remote communications device.

13. A method comprising:
recognizing, by a computer in a very small aperture terminal, a failure event during operation in a first mode for exchanging messages with a second terminal;
initiating a spectrum analysis test triggering event based on recognizing the failure event;
generating one or more measurement parameters based on a type of the recognized failure event;
specifying a set of test parameters based at least in part on the generated one or more measurement parameters, the set of test parameters including one or more of a test frequency range, a resolution, a dwell time, an RX polarization and a number of passes;
reconfiguring a receiver in the very small aperture terminal from the first mode for exchanging messages with the second communications terminal to a second mode for receiving sequentially a plurality of signals from the second communications terminal, each signal being received in one of a plurality of frequency bands within the test frequency range based on the specified set of test parameters; and
measuring, via the receiver, at least one characteristic of the signal received respectively in each frequency band.

14. The method of claim 13, wherein the at least one characteristic of the signal includes I and Q values of the signal; the I value including an amplitude and phase as a function of time of a real component of the signal and the Q value including an amplitude and phase as a function of time of an imaginary component of the signal.

15. The method of claim 14, further comprising:
storing the I and Q values in a memory; and
analyzing the stored signal characteristics to determine a spectrum distribution over the frequency test range.

16. The method of claim 15, further comprising:
storing data representing the spectrum distribution.

17. The method of claim 13, further comprising:
identifying a trigger event from at least one of user input, a remote communications device communicatively coupled with the very small aperture terminal and data indicating that a failure event has occurred during operation of the very small aperture terminal; and
initiating the spectrum analysis test based on the trigger event.

18. The method of claim 13, further comprising:
sending a notification to one or more remote communications devices that the very small aperture terminal is out of service, prior to starting the spectrum analysis test;
resetting the receiver for communications with one or more remote communications devices following the spectrum analysis test; and
sending notification to at least one of the one or more remote communications devices that the very small aperture terminal is back in service.

19. The method of claim 13, further comprising:
receiving at least one of the test parameters from at least one of user input and a remote communications device.

\* \* \* \* \*